(12) United States Patent
Köster

(10) Patent No.: US 6,240,999 B1
(45) Date of Patent: Jun. 5, 2001

(54) STEPPED LAMELLA FOR GUIDING LIGHT RADIATION

(76) Inventor: Helmut Köster, Karl-Bieber-Höhe 15, D-60437 Frankfurt am Main (DE)

( * ) Notice: Subject to any disclaimer, the term of this patent is extended or adjusted under 35 U.S.C. 154(b) by 0 days.

(21) Appl. No.: 08/894,498
(22) PCT Filed: Sep. 18, 1995
(86) PCT No.: PCT/EP95/03654
§ 371 Date: Jul. 31, 1997
§ 102(e) Date: Jul. 31, 1997
(87) PCT Pub. No.: WO96/08629
PCT Pub. Date: Mar. 21, 1996

(30) Foreign Application Priority Data

Sep. 17, 1994 (DE) .................................. 44 33 228
Dec. 2, 1994 (DE) .................................. 44 42 870

(51) Int. Cl.[7] .................................................. E06B 9/26
(52) U.S. Cl. .................... 160/176.1 R; 160/107; 160/236
(58) Field of Search .............................. 160/236, 173 R, 160/107, 176.1 R, 166.1 R; 49/92.1

(56) References Cited

U.S. PATENT DOCUMENTS

| | | | |
|---|---|---|---|
| 1,271,800 | * 7/1918 | Sutton ............................... | 60/236 X |
| 2,103,788 | * 12/1937 | Mohrfeld ............................ | 160/236 |
| 2,146,816 | * 2/1939 | Grassby ............................. | 160/236 |
| 3,384,147 | * 5/1968 | Smith ................................. | 160/107 |
| 4,292,763 | * 10/1981 | Barnes et al. ...................... | 160/236 X |
| 4,486,073 | * 12/1984 | Boyd ................................. | 160/236 X |
| 4,509,825 | * 4/1985 | Otto et al. ......................... | 160/236 X |
| 4,519,675 | * 5/1985 | Bar-Tonah ......................... | 350/259 |
| 4,773,733 | * 9/1988 | Murphy et al. ................... | 160/386 X |
| 4,841,672 | * 6/1989 | Nenurh ei th ..................... | 49/236 |
| 5,209,282 | * 5/1993 | Francoe et al .................... | 160/236 |
| 5,832,979 | * 11/1998 | Msarusk ............................ | 180/173 |

* cited by examiner

Primary Examiner—David M. Purol
(74) Attorney, Agent, or Firm—Koda & Androlia

(57) ABSTRACT

The present invention relates to lamellae for light deflection and for scattering radiation, particularly sun radiation. The lamellae comprise two portions wherein the first portion is graded like stairs. It serves for scattering sun radiation. The second portion is oriented towards the interior space and is preferably convexly arched ascending towards the interior space. Sun radiation impinging onto the second portion is deflected to the ceiling of the interior space and into the space depth. The tread-board and the second lamella portion are disposed at an angle Ω relative to each other.

18 Claims, 6 Drawing Sheets

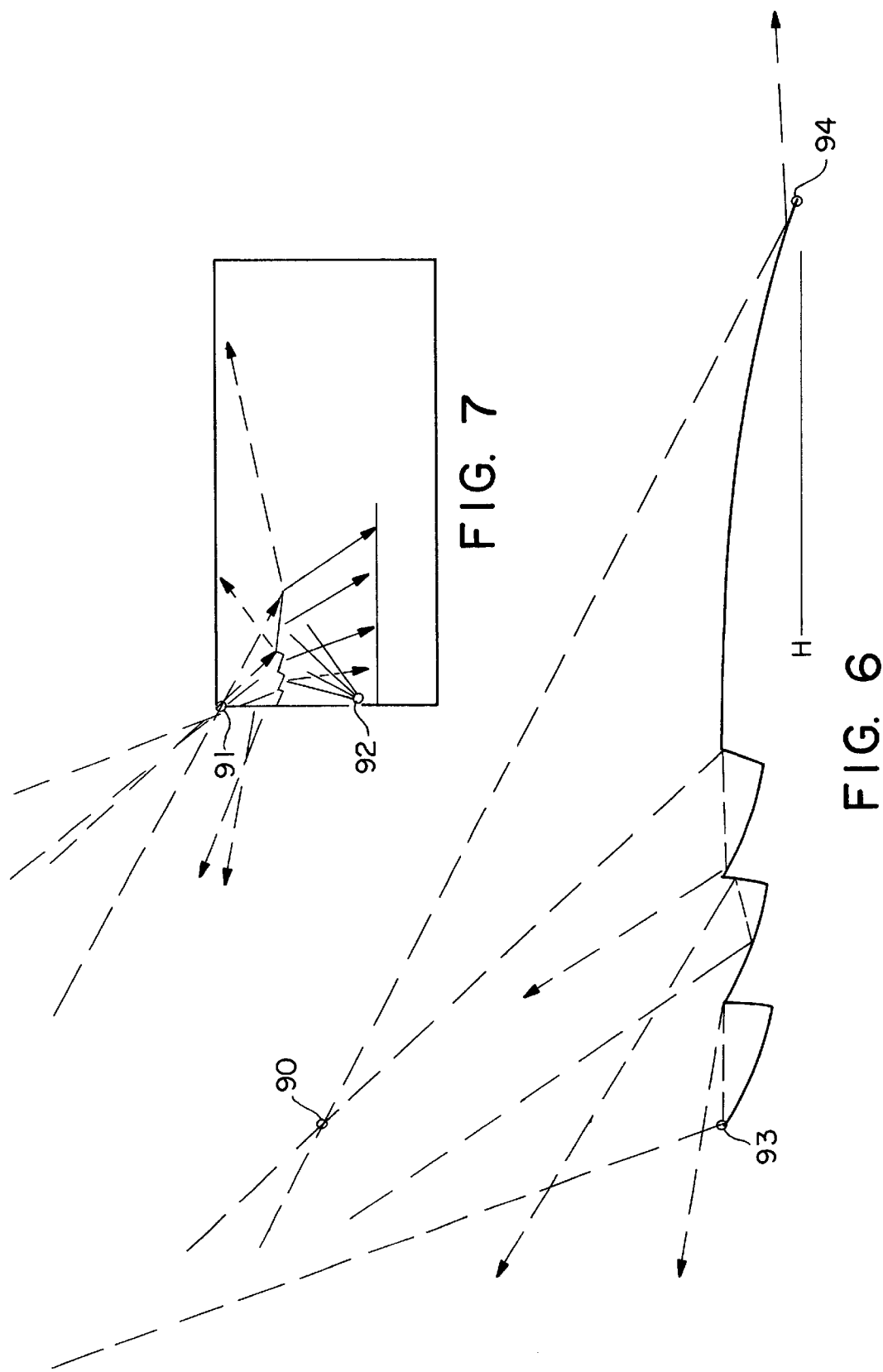

FIG. 8.1

STEPPED LAMELLA FOR GUIDING LIGHT RADIATION

BACKGROUND OF THE INVENTION

1. Field of the Invention

The present invention relates to lamellae for light deflection and for radiation scattering comprising a first portion, located in the area of irradiation E, including a step-shaped gradation of the lamella leaf consisting of a treadboard and a riser wherein the inclination β of the treadboard forms an incline from the area of irradiation to the interior space, and a second portion.

2. Prior Art

From U.S. Pat. No. 2,103,788, it has been known to shape sun shade lamellae like steps and to arrange the lamellae horizontally. The disadvantage of such arrangement is that, both in summer and in winter, direct sun radiation is completely scattered. A further disadvantage is seen in that the lamellae are so tightly next to each other that transparency from within to the outside is not possible. An additional disadvantage is that only bottom radiation can penetrate between the lamellae into the interior space so that the interior space is not sufficiently illuminated.

It has furtheron been known to shape the lamellae for radiation screens as steps where the individual steps are arranged at different angles relative to each other and the treadboard and the riser are arranged in various lengths (German Offenlegungsschrift No. 27 32 592). From German Offenlegungsschrift No. 42 39 003 A1, too, sun shade lamellae have been known which are shaped as steps on the upper side and are disposed at right angles relative to each other. At the underside, the sun shade lamellae described are also shaped as steps. The individual steps on the underside of the lamella leaf are partly shaped concavely or convexly. The gradings on the upper side of the sun shade lamella are shaped level or plane. This causes reflection of the light radiation from the upper side of a lamella onto the underside of the upper lamella. On the underside of the upper lamella, the light radiation is then deflected by a corresponding concave shape so that controlled light deflection onto the working or ground area is obtained. Light deflection to the ceiling and into the depth of the room is only restrictedly possible. The double light deflection to the upper or the underside, respectively, of the sun shade lamellae is considered a disadvantage since each reflection, even on specular surfaces, leads to an absorption at the lamellae. The absorption leads to undesired heating up and reduction of the light radiation. If only the underside is arched and the upper side is plane or level, high angles of incidence of the sun in summer may lead to a plurality of reflections between the lamella leafs until the ray is reflected into the interior space or again to the outside. This leads to considerable warming up of the lamellae which, particularly in summer, is experienced as inconvenient heat radiation in the interior space. In case of a reflection movement between the lamellae, one cannot guarantee that light incidence is deflected to the ceiling and, in order to illuminate the depth of the room, into the interior depth. Glaring at the working place might even be experienced since no exact control over the angle of the light incidence into the interior space can be exerted.

SUMMARY OF THE INVENTION

It is, therefore, the aim of the present invention to provide lamellae on which, in summer, the sun light with high angles of incidence of the sun is completely scattered without resetting the lamellae, and flat sun radiation in winter and diffuse radiation is partly deflected to the ceiling and into the depth of the interior space while the lamellae need not necessarily be turned to a horizontal axis.

This problem is solved in accordance with characterizing clause of claim 1.

The advantage of the innovation is that, contrary to all prior art sun shade lamellae, they may remain even in case of high angles of incidence in a flat opened position so that light penetration and light deflection is warranted at an optimum in favor of interior depth illumination even if direct summer sun is scattered. At the same time, transparency of the sun shade is maintained. The disadvantage of sun shades normally experienced in the summer sun when they are tilted to a closed position and thus become non-transparent and light impermeable, is avoided. Further advantages will become apparent from the description based on the figures wherein

BRIEF DESCRIPTION OF THE DRAWINGS

FIG. 6 is the cross section through a large lamella;

FIG. 7 is the disposition of the large lamella in the high window area in an approximately horizontal position;

DETAILED DESCRIPTION OF THE INVENTION

Figure 1:
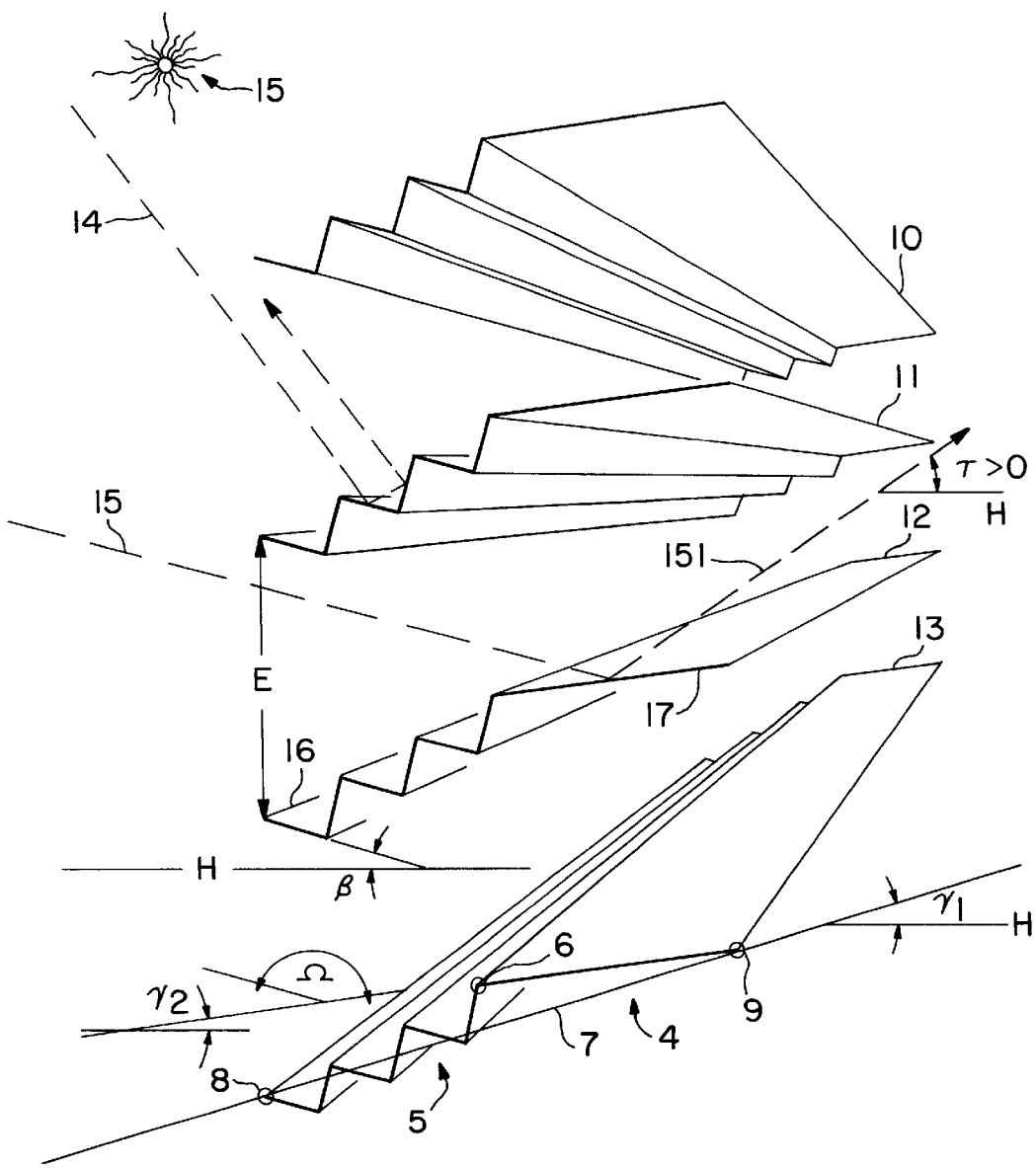
FIG. 1 is a perspective section through a plurality of lamellae disposed one upon the other, such as for instance of a sun shade.

FIG. 1 illustrates the cross section through a horizontal sun shade comprising lamellae 10 through 13 disposed at an inclination to the sun 15. The lamellae are composed of a stepped first portion and an area-shaped second portion. The stepped portion is, on principle, oriented towards the outside space and the area-shaped portion towards the interior space. The sun shade may be mounted in the outside space, in the interior space or in the intermediate air space between an insulation glass window. The term sun shade as used in the present examples also includes all inelastic lamella systems, i.e. also such systems which cannot be moved together and are rotatably supported about an axis or which may be stationarily arranged. Light radiation 4 inciding from outside onto the stepped lamella portion is reflected back to radiation cross section E. Light radiation 15 inciding at a flat angle of incidence onto the area-shaped lamella portion oriented towards the interior space is reflected by means of beam 15.1 into the interior space. By inclination of the second portion, the reflected light radiation is reflected into the interior space essentially at an angle τ>0. Treadboards 16 have an angle of inclination β relative to horizontal H. The treadboards show an inclination from radiation cross section E between the starting points of two superimposed lamellae to the interior space. The inclinations of the tread-board and of the second area-shaped portion 17 have an obtuse angle Ω relative to each other wherein, in most cases, the inclination $\gamma_2$ of the second portion, as in the present case, is opposed to inclination β of the treadboard and is constant or, advantageously, increases, continuously or discontinuously, as can be taken from the following figures.

This rule applies for all embodiments of the present invention. The starting point is in each case the point which is nearest to radiation cross section E.

It is of advantage, if a line 7 through starting point 8 and end point 9 of lamella 13 takes an angle γ of $$\gamma = 0-30°.$$

The total lamella may be convexly curved as in the present case. The end point 6 of the first portion 5 or the starting point of the second portion 4 is above a straight line 7. This point 6 may also be disposed on straight line 7 or below straight line 7, which essentially leads to a concave shape of the lamella.

On the radiation side, the surfaces of the lamellae are highly reflective, i.e. white or preferably specular or for instance are provided with a dull silver, aluminum or gold luster. The underside of the lamellae may also be either specular or dull or colored, e.g. white or colorfully japanned.

Figure 2:
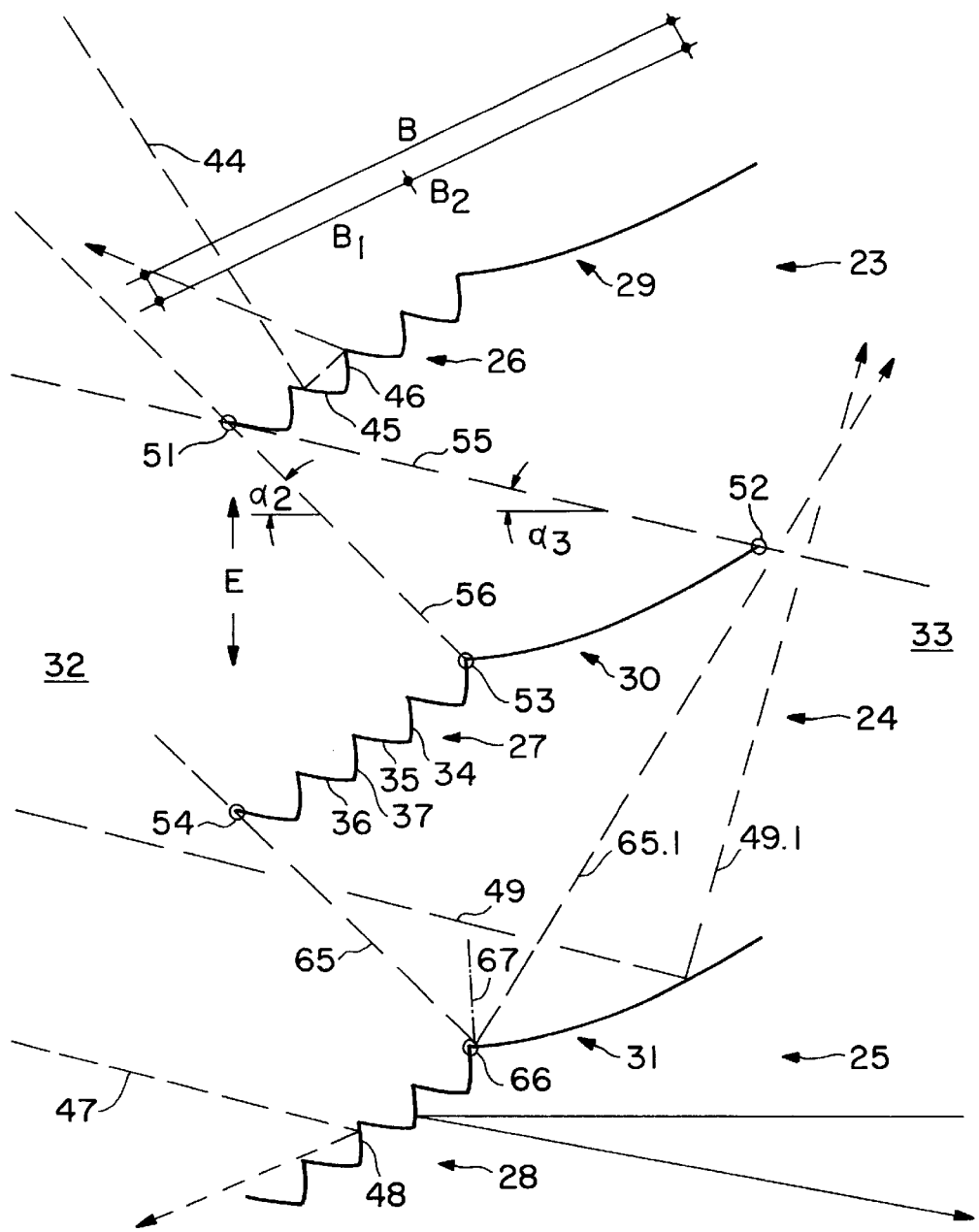
FIG. 2 is a cross section through three horizontal sun shade lamellae disposed one upon the other.

FIG. 2 shows a cross section through three sun shade lamellae 23, 24, 25 disposed one upon the other. The sun shade lamellae include a first portion 26, 27, 28 oriented towards the outside space 32 and a second portion 29, 30, 31 oriented towards the interior space 33. The first portion 26, 27, 28 is formed of a step-shaped reflector which is composed of a plurality of reflector portions 34, 35, 36, 37 and so on and, for instance, forms an angle of lead.

The steps of the first portion include concavely shaped treadboards 35, 36, 45 and concavely shaped risers 34, 37, 46, 48. The risers 34, 37, 46, 48 may also be plane or convex.

An inciding ray 44 impinges onto riser 45 of the first portion 26. At treadboard 45, ray 44 is reflected onto riser 46. At the riser, ray 44 is reflected back to the outside space 32. A flat sun ray 47 impinging onto riser 48 of first portion 28 is reflected back by it directly into outside space 32. Riser 34, 37, 46, 48, in particular, is arched from the interior space so that it is not possible that the looker on from the interior space is reflected or is dazzled by reflection.

By the arched formation of treadboard and risers of the first portion the sun shade lamellae according to the teaching of the present invention, it can be safeguarded that the complete radiation reflected back from the lamella to the outside space in favor of a passive cooling of the interior space is diffusely scattered.

At the steps, the flat winter sun is only partly reflected to the outside while a further part which impinges onto the second portion 29 to 31 is deflectable into the space depth. A similar case is the diffuse radiation. Diffuse radiation is deflected into the space depth as well. It constitutes part of the teaching of the present invention to so shape the second portion and bend it that radiation 65, 65.1 is not, or just somewhat, reflected onto the underside of the upper lamella but mainly directly onto the ceiling of the interior space. This shaping of the second portion may be made as a curve or in segments of straight or arched portions. The distance between the lamellae and the starting and end points of the lamellae is determined as follows:

A shadow line 55 between starting point 51 of an upper lamella 23 and the end point 52 of a lower lamella 24 forms an angle of $\alpha_3 < 30°$.

A shadow line 56 between starting point 51 of an upper lamella 53 of the first portion 27 of the lower lamella forms an angle of $\alpha_4 > 30° < 60°$.

These data refer to the normal position and may change if the lamellae are rotated about an horizontal axis.

The first portion 26, 27, 28 and the second portion 29, 30, 31 have a width of $B_1$ and $B_2$, respectively. The following proportions are valid:

$$B = B_1 + B_2 = 1.$$

The portions are to the total width as $$B_1/B = 0.5 \pm 0.1$$

and $$B_2/B = 0.5 \pm 0.1$$

When designing the second portion it is essential that the reflection paths be so controlled by the tangent inclination of the curve points that the sun is not reflected onto the underside of the upper lamella. This process will be explained based on lamella 24 and 25: A shadow line 65 falling into the starting point 66 of second portion 31 of lamella 25 should reflect below end point 52 of upper lamella 24 into interior space 33. The construction of the tangent inclination in point 66 is performed in a manner known in the art by determining angle bisector 67 between inciding ray 65 and reflected ray 65.1. Similarly, the exact trace of the curve of the total second portion 29, 30,31 of lamella may be projected. The trace of the curve may of course be selected flatter by no means however steeper, as has been explained in connection with ray path 49, 49.1, unless one allows reflection on the lower side of the upper lamella.

Figure 3:
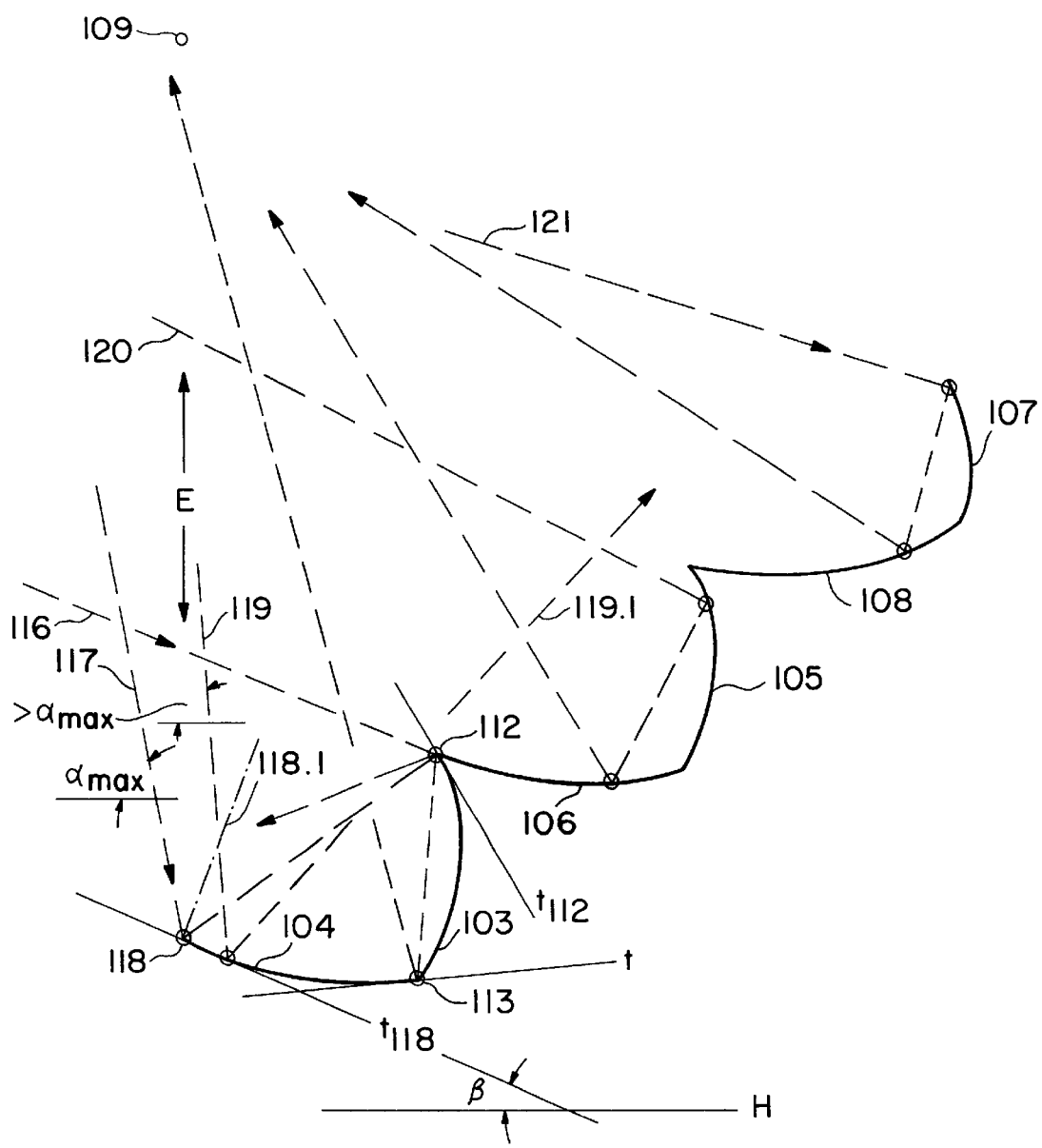
FIG. 3 is a cross section through a first portion of a stepped sun shade lamella in horizontal disposition.

FIG. 3 serves for the exact definition of the shaping of the first graded portion. The maximum angle of incidence at fagade $\alpha_{max}$ is determined. This is the highest angle of incidence in dependence on the degree of latitude and on the cardinal point of the facade. A ray 117 inciding at an angle $\alpha_{max}$ into starting point 118 of treadboard 104 is reflected onto riser 103. As the outermost meeting point, the starting point 112 on riser 103 is determined so that it is avoided that a direct sun ray which might lead to overheating can penetrate into the interior space. From point 112, the ray is reflected back through radiation cross section E into the outside space. The angle bisector between inciding ray 117 and reflecting ray 117.1 is constructed in point 118 and the tangent inclination $t_{118}$ is found perpendicular to angle bisector 118.1. Tangent $t_{118}$ may be steeper, at a steeper angle β, to horizontal H, should not, however, be inclined more flatly. Diffuse zenith radiation 119, 119.1 at an angle of incidence $> \alpha_{max}$ is intentionally guided into the interior space.

The construction of the riser is performed according to the same method: Ray 116 in point 112 is so guided by the inclination of tangent $t_{112}$ that it is reflected back from riser 104 in point 113 into radiation cross section E. At a south facade in Frankfurt, $\alpha_{max}$ amounts to about 68°. Radiation 119 at an angle $> \alpha_{max}$ is partly deflected into the interior space and leads to an increased illumination with diffuse sky radiation from the zenith. It is obvious that a type designed for a south facade can also be employed on the east or west facade.

Following various ray paths 120, 121, it can be observed that each treadboard and riser can be made differently depending on its location relative to the starting point of the upper lamella. Treadboards 104, 106, 108 become longer with increasing distance from the radiation cross section, risers 103, 105, 107 become shorter with increasing distance from the radiation cross section.

This regularity refers to the relative sizes between an optically connected treadboard and a riser. Assuming the relative sizes of the first tread-board and riser in the radiation cross section equal to 1, the ratio of treadboard to riser of at least the last step is >1.

Figure 4:
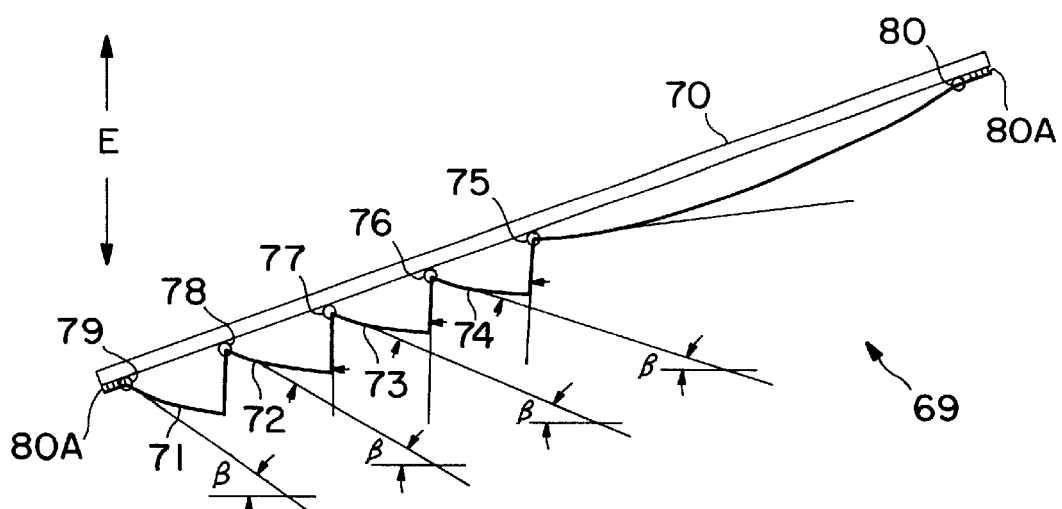
FIG. 4 is the section through a lamellae having a glass covering.

FIG. 4 shows lamella 69 of the invention in combination with an outer cover 70 consisting for instance of glass or plexi glass or of a foil. Such a lamella is advantageously employed in the outside space in front of the facade. Connection between lamella 69 and outer pane 70 is brought about for instance by means of a water-vapor diffusion-tight glue 80A as known from insulation glass production. Starting points 75 to 79 of the treadboards and endpoints 80 of the second portion are on a straight line. Treadboards 71 to 74 in their starting point 75 to 79 form an angle $\beta$ relative to horizontal H which decreases with increasing distance from radiation cross section E. The tangents of the starting point of the treadboards and risers for an acute angle $\beta$.

Figure 5:
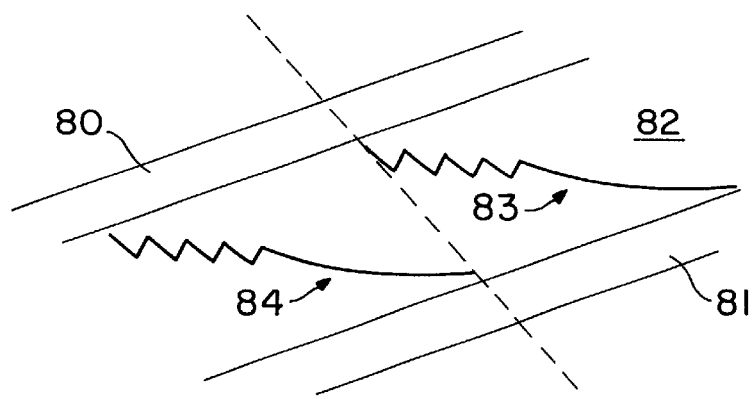
FIG. 5 is the section through an insulating glass window for inclined roof surfaces having an inlet made of the lamellae according to the invention.

FIG. 5 illustrates an insulation glazing including an outer pane 80 and an inner pane 81. Within air space 82 of the insulation glazing, lamellae 83, 84 are installed which correspond to the form of the invention. Such insulation glazing is installed into a roof glazing having an inclination.

FIG. 6 shows a large lamella which may for instance be installed between the lower window area and the high window area of an interior space. Essential for the construction is point 90 which corresponds to lintel edge 91 in FIG. 7. The construction of the lamella is performed in a manner known in the art with relative to such lintel edge 91. According to the explanation made in FIG. 2, lintel edge 91 corresponds to the starting point of an upper lamella. The particular advantage of the large lamella is shown in FIG. 7: The lamella may also serve for guiding the light of an indirect light source 92. The light source is arranged as an oblong lamp or as a spot light in the area of the window sill and radiates the light onto the underside of the lamella. On the underside, the light is deflected to the desk according to DIN. The particular feature of the lamella of FIGS. 6 and 7 is the horizontal expansion. Thus the lamella construction of the invention permits the provision of lamellae having horizontal alignment and lamellae having an inclination towards the ground level which, nevertheless, show the desired radiation behavior in favor of a passive cooling effect in summer and a reduction of glare into the outside space. The advantage of this construction is seen inter alia in that the lamella, when in an opened position, offers a very good transparency and a very high diffuse light entrance into the interior space. The example shows that the lamella may also take an inclination of <0 with an inclination towards the interior space.

The lamella may be composed of a plurality of individual reflectors wherein for instance each treadboard and each riser forms one reflector strip all of which are composed to form a step-shaped structure. The second portion, too, may be composed of a plurality of arched lamellae disposed one next to the other.

Figure 8:
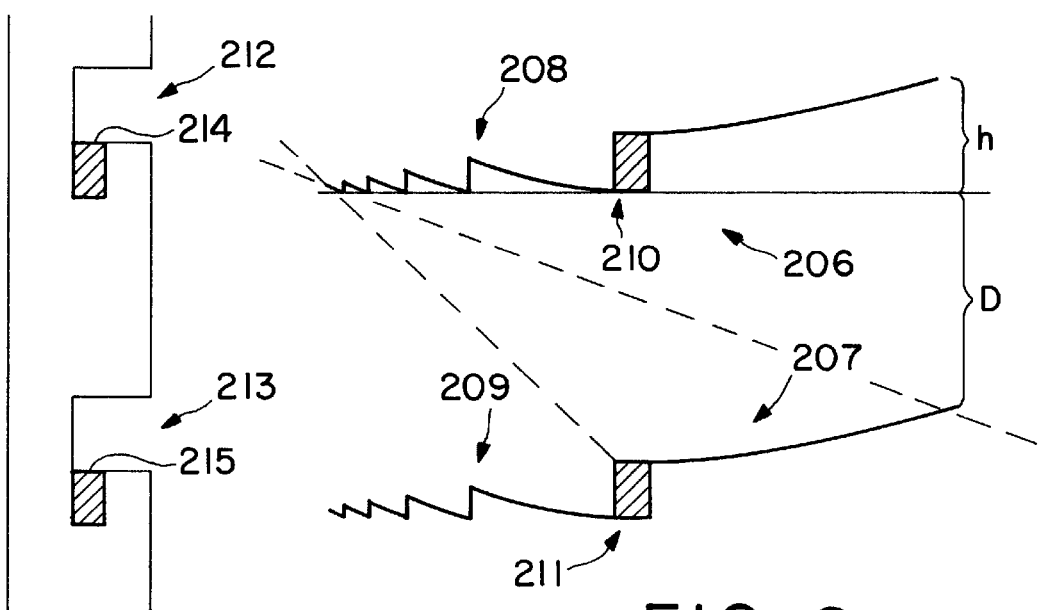
FIGS. 8, 8.1 are further lamellae and the mounting thereof.

FIG. 8 shows two lamellae 206, 207. The first portion 208, 209 includes steps which, starting from the radiation cross section, increase in size. The advantage of this design is that the lamella is very narrow. Transparency D between the lamellae is a multiple of the height h of the lamellae.

Lamellae 206, 207 include a particularity: They include grooves 210, 211 into which a reinforcement, such as for instance sheet steel, may be inserted. The lamella may also be designed as a hollow profile in order to receive the reinforcement. At the same time, the grooves serve, in FIG. 8.1, for receiving supporting bolts 214, 215 which are inserted into the grooves and which extend above the lamella and are kept in detent. Such detent is shown in FIG. 8.1. The detent comprises a metal sheet disposed at the front sides and including the recesses 212, 213. In the recesses, supporting bolts 214, 215 can be seen extending at the front sides from the grooves. By the bolts, the profile is mounted in a fixed position.

Figure 9:
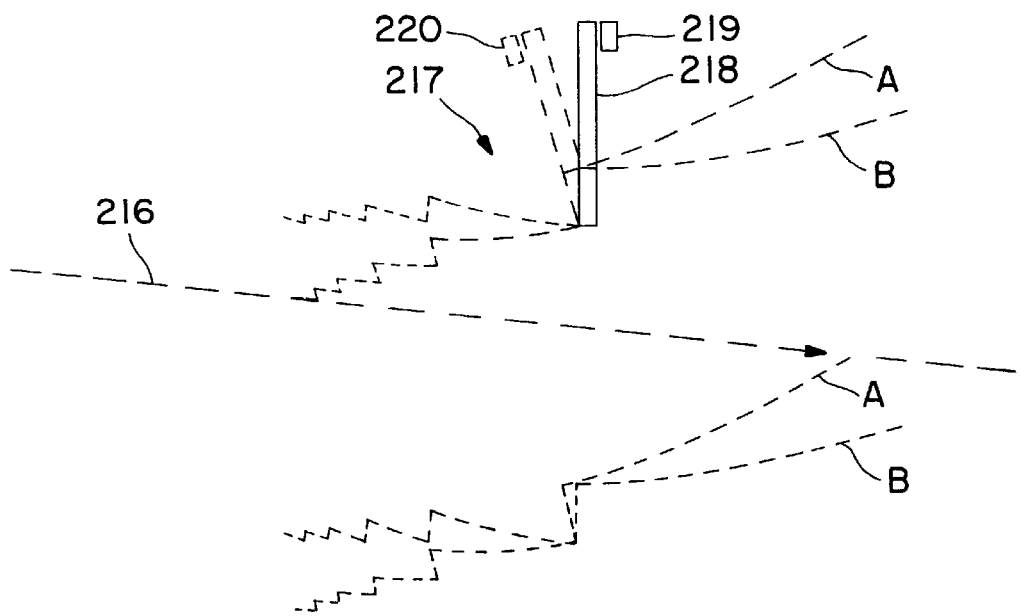
FIG. 9 are magnetically controlled lamellae.

FIG. 9 shows the same lamellae as in FIG. 8 except that the lamellae are rotatably supported about a horizontal axis. They are depicted in base position A and in tilted position B. By tilting the lamellae to position B, the system closes against the flat sun 216. Tilting of the sun shade lamellae is performed either in a commercial way or by a magnetic pulse. This will be explained based on the upper lamella 217: Into grooves 210, 211 from FIG. 8, bolts are inserted which have a bent arm 218. The tip of the arm touches magnet 219, 220. Depending on the current pulse, the arm is drawn to either alternating magnet 219 or 220 so that the lamella tilts into the desired position A or B. One could also think of a third tilted position which may be obtained in a comparable way by means of a swivel arm provided on the opposed front sides of the lamellae.

Possible is also a base position A to which the system will tilt independently based on an imbalance in the superposition and also a position B, and perhaps even C, to which the system is turned by a magnetic pulse.

A further embodiment of the present invention not illustrated though very advantageous is constituted by the penetration of spaced horizontal lamellae through orthogonally arranged further lamellae so that a raster-shaped area structure is obtained. The orthogonally penetrating lamellae may either be smooth or convexly shaped on the surface thereof or may also be shaped as steps. It is of particular advantage to provide such reflecting raster elements in the air intermediate space of insulation glazing on the roof or facade area.

The lamellae are made of steel, aluminum or a plastic material. Preferred production procedures include roll shaping from a steel or aluminum sheet, the aluminum pressing procedure, the drawing and/or rolling procedure or the plastic extrusion procedure. Lamellae produced by the roll shaping method preferably show on the upper side thereof the same contour as on the underside thereof. Lamellae produced by the press or extrusion method or by the drawing and rolling process may show on the underside thereof a contour which is completely different from that on the upper side. It is for instance possible to provide channels or grooves on the underside. The underside of the first portion may be smooth so that the stepped structure is not visible. The underside may have a course of the curve of its own developed by different optical laws such as for instance for the reflection of artificial light from the interior space or for the reflection of artificial light flooded onto the facade back to the outside space.

What is claimed is:

1. Lamellae (10, 11, 12, 13, 23, 24, 25, 69, 83, 84, 206, 207) for light deflection and scattering of radiation comprising a first portion (5, 26, 27, 28, 208, 209) disposed in a radiation area having a step-like gradation of lamella leaves consisting of treadboards (6, 35, 36, 45, 71, 72, 73, 74, 104, 106, 108) and risers (34, 37, 46, 103, 105, 107) where an inclination $\beta$ of at least a first treadboard at least in a starting point forms an incline from the radiation area to an interior space (33), and a second portion (4, 29, 30, 31), characterized in that:

(a) at least an upper side of said first portion includes at least one treadboard with an inclination deviating at least at a starting point (8, 51, 54, 118) relative to at least portions of said second portion (6, 66, 53, 29, 30, 31), (b) the inclination β at least in the starting points (8, 51, 54) of said first treadboard (16) and at least parts of said second portion (6, 66, 53) form an obtuse angle Ω relative to each other, and (c) daylight radiation impinging onto lamellae (10, 11, 12, 13, 23, 24, 25, 69, 83, 84, 206, 207) is deflected by said first portion (5, 26, 27, 28, 208, 209) into the radiation area and daylight impinging onto said second portion (4, 29, 30, 31) is deflected into the interior space (33).

2. Lamellae according to claim 1, characterized in that a tangent inclination of said second portion (17, 29, 30, 31) towards an interior space (33) is an ascending angle γ increasing between tangent and horizontal.

3. Lamellae according to claim 1, characterized in that in a cross section, the starting point (8, 51, 54) of the lamella (10, 11, 12, 13, 23, 24, 25, 69, 83, 84, 206, 207) constitutes the starting point of said first portion (5, 26, 27, 28, 208, 209) and that an endpoint (9, 52, 80) of the lamella constitutes the endpoint of said second portion (4, 29, 30, 31) and that said first portion $B_1$ and said second portion $B_2$ are in a width relation relative to the total width as $B_1/B=0.5\pm0.1$ $B_2/B=0.5\pm0.1$.

4. Lamellae according to claim 1, characterized in that on the lamellae vertically arranged one upon an other, between the starting point (51) of an upper lamella (23) and the endpoint (52) of a lower lamella (24), a shadow line extends at an angle $\alpha_3$ of $\alpha_3<30°$ and that the inclination of a shadow line (56) between said starting point (51) of an upper lamella (23) and said endpoint (53) of said step-like first portion (27) of! a lower lamella (24) extends at an angle $\alpha_2$ of $\alpha_2>30°<60°$.

5. Lamellae according to claim 1, characterized in that at least the endpoint (75) of a last step of said first portion is on a straight line connecting the starting point (79) of said first portion with the endpoint (80) of said second portion.

6. Lamellae according to claim 5, characterized in that a straight line (7) between the starting point (8) of a lamella (13) in the radiation area and the endpoint (9) of this lamella forms, to the interior space (33), an angle $\gamma_1$ relative to the horizontal of $\gamma_1=0$ to $30°$.

7. Lamellae according to claim 1, characterized in that said second portion (4, 29, 30, 31) forms a lamella strip disposed to the interior space (33), said lamella strip being arched and formed of at least one of straight segments and arched segments, and that a course of a curve of said second portion or of the segments thereof is ascending starting from said first portion towards the interior space.

8. Lamellae according to claim 1, characterized in that at least one of risers (34, 37, 46, 103, 105, 107) and treadboards (16, 35, 36, 45, 71, 72, 73, 74, 104, 106, 108) of said first portion (5, 26, 27, 28, 208, 209) are concavely arched and that a ratio of treadboard to riser at least in a last gradation (108/107) is larger than at the first gradation (104/103) in the radiation area.

9. Lamellae according to claim 8, characterized in that at least risers of said first portion which are most distant from the radiation cross section are convexly shaped.

10. Lamellae according to claim 1, characterized in that treadboards and risers (208, 209) of the lamellae (206, 207) become larger as from the radiation cross section towards the direction of said second portion.

11. Lamellae according to claim 1, characterized in that lamellae (83, 84) are provided in a air intermediate space of an insulation glazing (80, 81).

12. Lamellae according to claim 1, characterized in that lamellae (69) on a sun incident side are combined with a light permeable cover (70).

13. Lamellae according to claim 1, characterized in that lamellae (206, 207) include grooves, or hollow cavities, respectively, at the underside thereof for respectively receiving reinforcements and supporting elements (214, 215).

14. Lamellae according to claim 1, characterized in that lamellae (206, 207) are tilted by magnetic pulse in that each individual lamella is rotated by swivel arms provided on either side and in that said swivel arms are attracted by alternating magnets, or elements (219, 220) equipped with alternating magnets are attracted or repulsed from them.

15. Lamella according to claim 1, characterized in that lamellae are arranged horizontally and one upon the other and that the lamellae are installed and rotatably supported in a sun shade on the facade or roof area.

16. Lamellae according to claim 1, characterized in that the lamella is arranged as an individual lamella between a high window are and a low window area and the lamella comprises a plurality of elements and one individual lamella have a width of up to more than 1 m.

17. Lamellae according to claim 16, characterized in that on at least one of an underneath the lamella on the outside or the inside space side a light source (92) is provided and the lamellae forms a reflector screen for artificial radiation on a lower side and for reflection of day light on an upper side.

18. Lamellae according to claim 1, characterized in that sun radiation reflected from said first portion is deflected essentially by one or two reflections into radiation cross section and that radiation reflected from said second portion is deflected by one single reflection into the interior space at an angle >0.

* * * * *